Patented Jan. 29, 1952

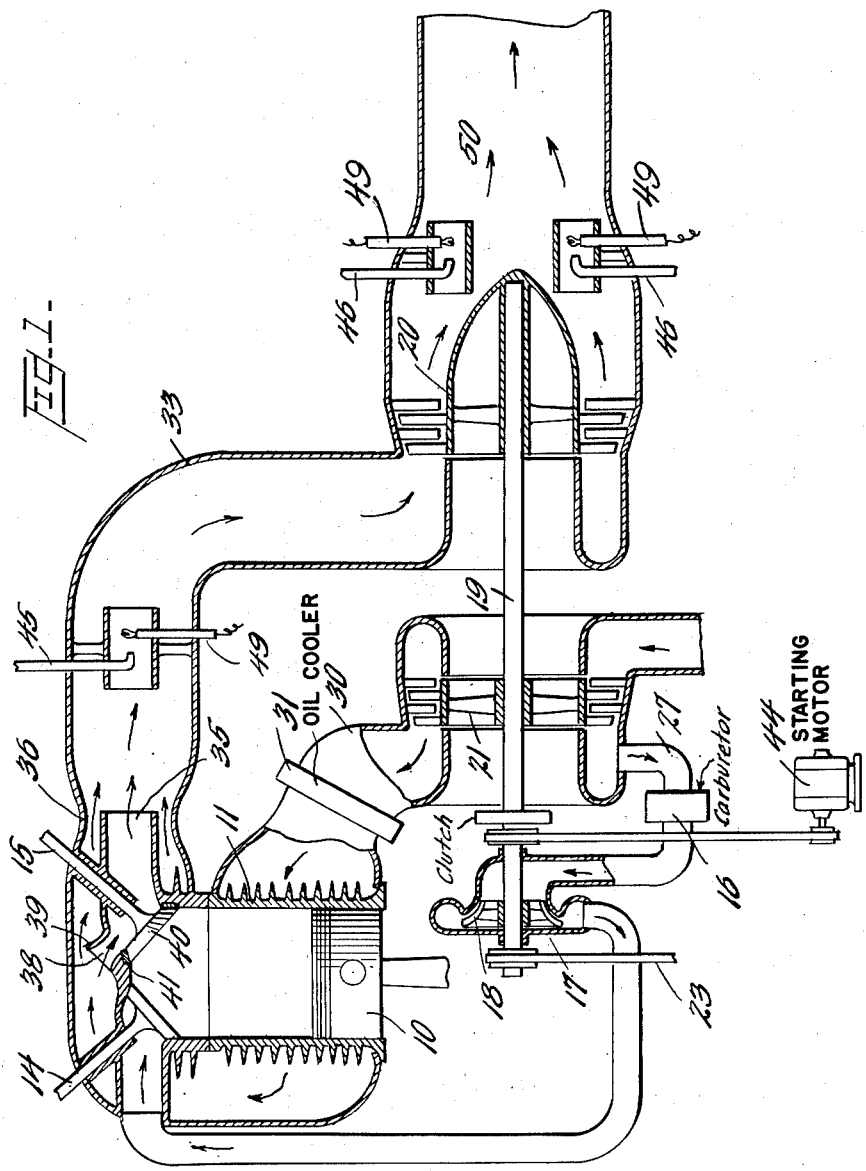

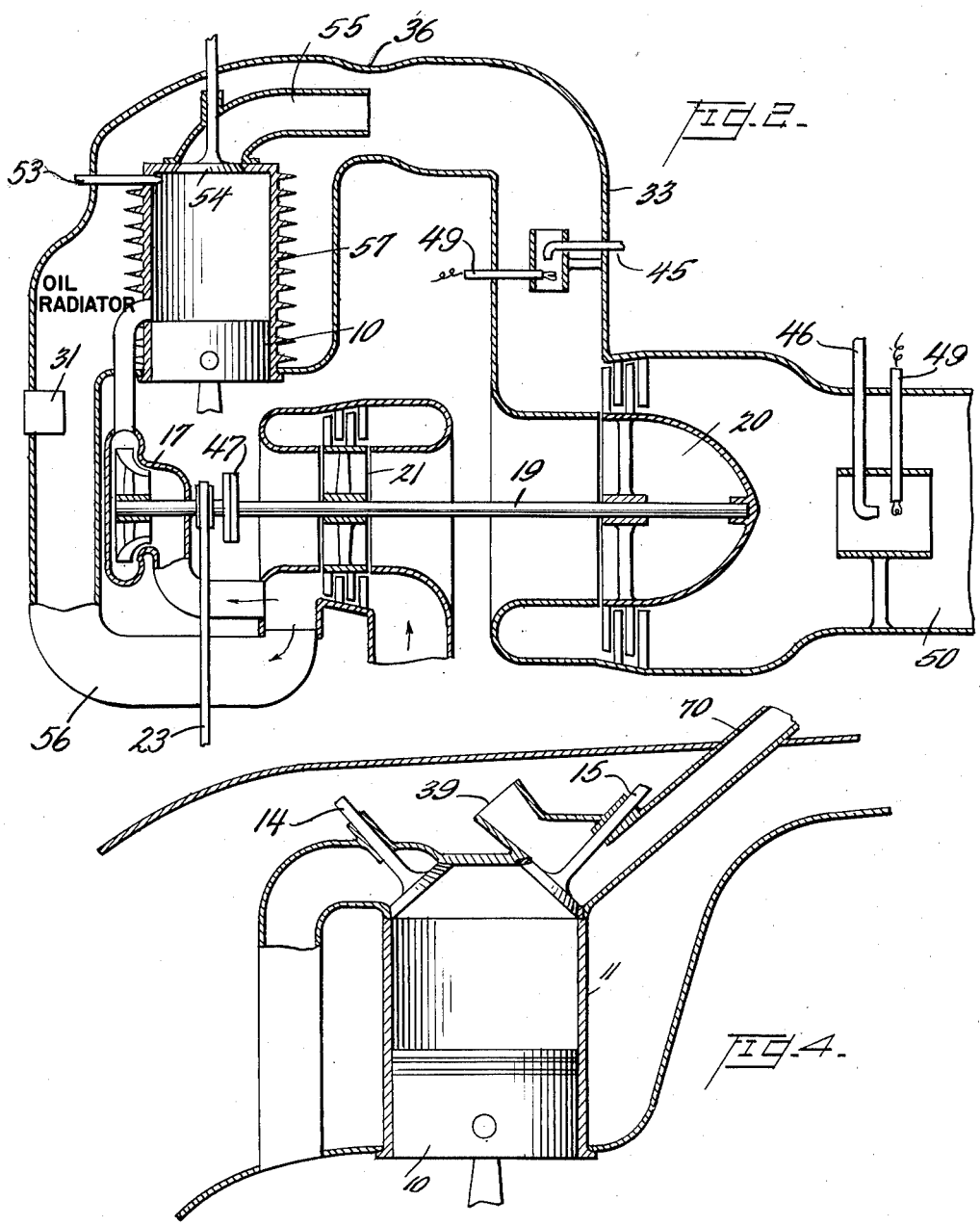

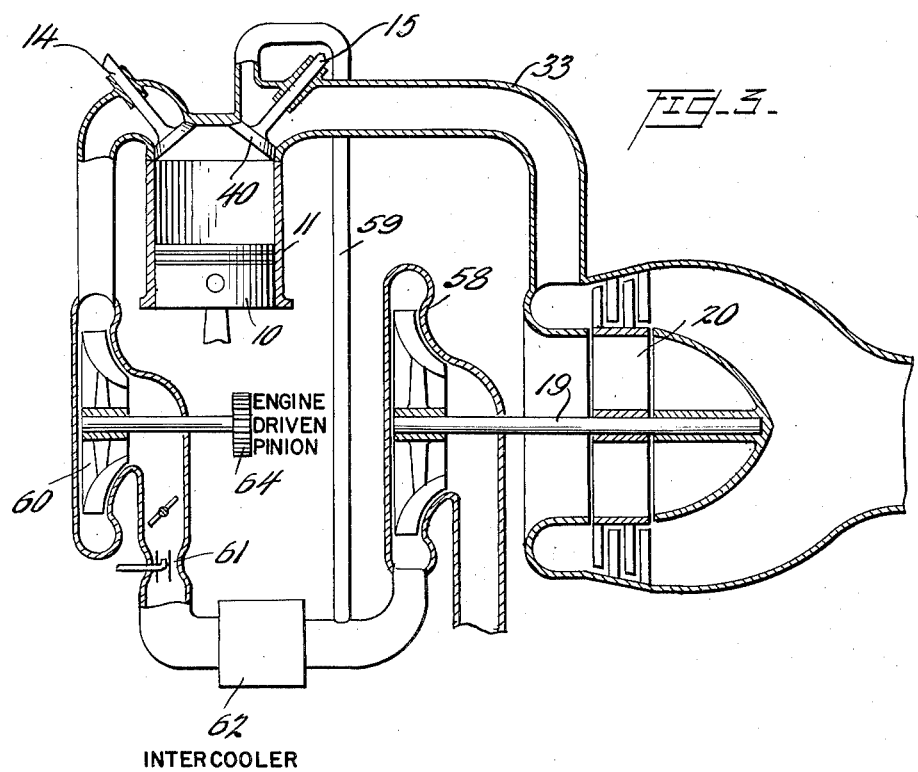
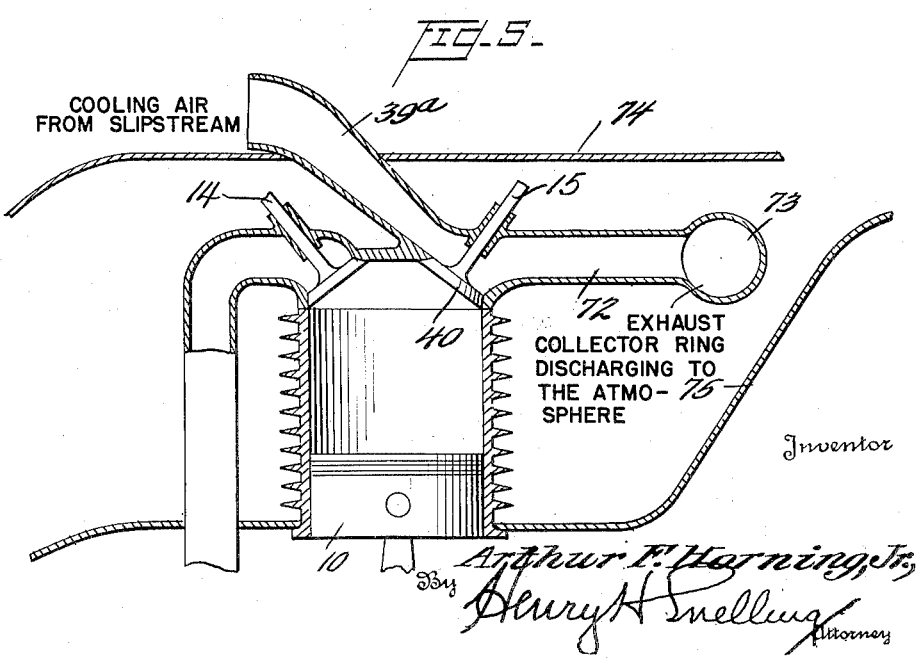

2,583,651

UNITED STATES PATENT OFFICE 2,583,651

AIRPLANE POWER PLANT WITH DIRECT COOLING OF EXHAUST VALVES

Arthur Fredrick Horning, Jr., Washington, D. C.

Application August 14, 1945, Serial No. 610,847

8 Claims. (Cl. 60—35.6)

This invention relates to power plants and has for its principal object the provision of a power plant particularly adapted for airplane use in which the waste heat of the power plant is utilized to develop power for cooling the engine and supercharging it, whereby the efficiency and output of the power plant may be increased.

A further object of the invention is to provide a system for cooling the cylinders of an internal combustion engine by means of air furnished by a rotary compressor powered by a gas turbine, with or without supplying fuel to the turbine. A further object is to provide a cooling system that will efficiently cool the power plant at full power regardless of the speed of the plane thru the air, as at take-off and when gaining altitude at a high rate.

A further object of the invention is to utilize the waste heat of the power plant to develop power for jet propulsion, which may be augmented by using additional fuel in the combustion chamber behind the gas turbine.

An important object of this invention is to utilize the power plant cooling system for jet propulsion should the power plant fail. Another important object is the provision of means to reduce the cooling drag of the airplane by removing all of the cooling means from the slipstream of the airplane and also to reduce the loss of power utilized in maintaining the engine at the proper temperature. This feature is accomplished by placing all of the cooling means within the shell of the airplane and by directing cooling air in its path from the compressor to the gas turbine around the engine cylinders, cylinder heads, and valves, thus increasing the temperature of the air and consequently the efficiency of the gas turbine. A still further object of the invention is to increase the power of the airplane when full power is needed.

While this power plant heat recovery cooling system is especially applicable to airplane power plants, the invention is not necessarily limited thereto but may be utilized on power plants wherever found applicable and may be used on radial, in line, or any other arrangement of cylinders.

An important feature is the direct cooling of the exhaust valves. By greatly reducing the temperature of the exhaust valves of the internal combustion engine, the full power and efficiency of the plant is increased. The passing of cooling air around the stems of the exhaust valves in proximity to the seats of these valves prolongs the life of the inserts as well as the life of the valves themselves.

In the drawings:

Figure 1 is a diagrammatic layout of a four-stroke cycle engine;

Figure 2 is a similar layout of a two-stroke engine;

Figure 3 is a modified design for a turbosupercharger in the plane; and

Figures 4 and 5 show modified designs of the exhaust valve cooling.

The piston 10 of the internal combustion engine, which may be of any desired type, is in cylinder 11 and has the usual intake and exhaust valves, 14 and 15 respectively. Air for the engine is supplied thru carburetor 16 adjacent a supercharger 17 which while preferred is not essential. Its rotor 18 is fast to the common shaft 19 of the gas turbine 20 and the compressor 21.

Air from the compressor 21 is discharged, partly thru the pipe 27 to the carburetor and partly thru pipe 30 and the oil cooler 31 to the engine and thence to the turbine 20 thru pipe 33. This cooling air for the engine, it will be noted, first comes in contact with the power portion of the cylinder, then to the upper part of the cylinder, and then around the exhaust nozzle 35 which directs the exhaust from the engine into the pipe 33 thru a restricted, venturi-like constriction 36.

It will be noted that the nozzle 35 has an opening 38 preferably surrounded by a slight and flared tube 39 or funnel, thru which cooling air is constantly flowing and is directed across the top of the exhaust valve head 40 and its stem 15 and close to the insert 41. As this space is the hottest portion of the entire engine it will be seen that by cooling it the temperature of the exhaust valve may be greatly lowered with a consequent increased efficiency as this valve is a critical item in the combustion effect and its temperature governs the amount of heat permissible in the system. Thus, whereas in ordinary installations the temperature of the exhause valves is about 1300° F., in my system the temperature of the exhaust valve is lowered to about that of the intake valve. An additional advantage is that much cheaper exhaust valves may be used. As may be seen in Figures 1 and 5 the axis of the exhaust valve stem 40 is about at right angles to the funnel intake axis and about a half right angle to the axis of the discharge passage, the latter therefore being about 135° from the intake axis.

A fine jet of fuel may be injected if desired at either the injector 45 in the pipe 33 between the engine and the turbine or at the injectors 46 beyond the turbine, where it would be used in take-off or for maximum power should the engine fail, or both injectors may be used at the same time. I find it convenient to use the injector 45 at light loads but this addition of fuel is of little or no use when working at full load as the temperature then is sufficient to operate the gas turbine at full efficiency for its task and also to provide extra power thru the belt 23 or the excess power may be used by exhausting the gases from the turbine 20 at a higher pressure which is then used for its jet propulsion effect.

The two fuel injectors are of considerable use in case of emergency, as for example should the power plant fail in flight. Then by continuously forcing fuel thru the nozzle 45 and igniting the mixture by the usual igniter 49, the pipe 33 becomes a combustion chamber. The combustion gases and the excess air force their way at high velocity and at a temperature of around 1000° thru the gas turbine 20, giving a strong jet effect for the continuous propulsion of the airplane. The velocity of the jet effects gases leaving the turbine may be further increased by injecting fuel thru nozzles 46, the space 50 then becoming a further combustion chamber. The gas turbine may be started by starting motor 44 should the power plant fail or if it is necessary to start the gas turbine after it has stopped. The high velocity of the exhaust gases from nozzle 35 is sufficient, under normal conditions, to start gas turbine 20. When used in an emergency, supercharger rotor or impeller 18 and power take off 23 may be disconnected by clutch 47.

While the amount of power for cooling required by most present installations is reasonably low at cruising speeds it mounts quite fast, rising for example, from say 2½% at 120 miles per hour to almost 10% at 225 miles per hour. With my system a great amount of this loss of power is avoided as the cooling drag due to apparatus in the slip stream is eliminated, and I am able to increase most materially the power and efficiency for higher speeds of airplanes.

The operation of my system as shown in Figure 1 is as follows: Air is taken from the slipstream at atmospheric pressure and at a temperature of say 70° F. In passing the compressor 21 these figures in pipe 30 are 5 to 10 pounds and 100° F. In passing the oil cooler the pressure is not appreciably changed but the temperature is increased about 20° F. so the air impinging upon the cylinders 11 is about 120° F. The loss of pressure is only about a half-pound or so at the venturi 36 but its temperature is now raised to about 300° F. and in the pipe 33 this increases to perhaps 1000° F. The exhaust pressure at the port in front of the nozzle 35 is about 75 pounds per square inch. Beyond the gas turbine the pressure has dropped to atmospheric and the exhaust gas from this turbine is as low as 400° F.

As all power plants burning gasoline with high output operate with a very high fuel-air ratio, considerable unburned fuel is exhausted from the power plant of an airplane. Most of this would continue to burn if oxygen were present. Cooling air passing in part thru the funnel and in part thru venturi 36 will unite with the unburned products of combustion in the exhaust gases and aids in the burning of these products to increase the power developed by the gas turbine. All excess air after combustion is complete will cool the exhaust gases discharged from nozzle 35 from 1800° to 1000° F., the latter being a safe limit for the continuous operation of a multistage gas turbine without any form of blade cooling.

This power plant heat recovery system will recover approximately 95% of all heat losses from the engine for developing additional power at the gas turbine. All of the heat from the oil radiator which includes bearing friction will be recovered, cooling losses from the cylinders and the cylinder heads will be recovered and all of the heat from the exhaust gases. The temperature within the cylinder jacket and the connecting pipes will be within the operating range of present metals, therefore all of these surfaces may be insulated to reduce heat losses. Unit construction of power plant and gas turbine will be possible with these lower operating temperatures and no other means of cooling will be necessary.

In Figure 2 a two cycle engine is shown and differs from Figure 1 previously described in that the cylinder cooling air travels from front to rear around and over the cylinder instead of passing around the lower portion first and then up and back over the top portion of the cylinder. This system may be used on either two-stroke or four-stroke engines. The air for scavenging and supercharging is supplied by a centrifugal supercharger 17. Scavenging air from supercharger 17 is admitted to cylinder 57 thru ports uncovered by piston 10. Exhaust gases are released by valve 54 into nozzle 55, which, in this modification, has no funnel 39, altho this may be used if desired. Oil radiator 31 is cooled by part of the air from blower 21.

In Figure 3 is shown a modified system of a turbosupercharger power plant. Air from the supercharger 58 passes in part thru the pipe 59 to the exhaust valve 40 for cooling it as previously described from a temperature of 1300° F. to approximately 800° F. All the heat absorbed by the cooling air from exhaust valve and valve insert will increase the efficiency of the exhaust turbine 20. This air will unite with the unburned products of combustion gases to increase the efficiency of the exhaust turbine.

The lowering of the temperature of the exhaust gases permits the use of unit construction of the power plant and the turbosupercharger, and this in turn eliminates the long connecting pipes for intake and exhaust and avoids the necessity for having such exhaust cooling means as the customary flame dampener before the exhaust gases are delivered to the turbosupercharger. The supercharger 60 is engine driven thru pinion 64, the carburetor is 61 and the intercooler is 62. The capacity of the turbosupercharger will be increased to supply cooling air for the exhaust valves, and the cooling of the exhaust gases to a safe value by the additional air permits of the replacement of the single stage exhaust turbine by a more efficient multistage exhaust turbine as no cooling of the blades will be necessary. The efficiency and maximum power output of the power plant will be greatly increased by the lower exhaust valve temperature. The greater advantage of this system is that the total weight is reduced by eliminating long piping, flame dampeners, and by unit construction of power plant and turbosupercharger.

In Figure 4 the power plant cylinders are cooled by air from the slipstream in preference to being liquid cooled. The exhaust is discharged from nozzle pipe 70 to the slipstream for exhaust jet propulsion. Cooling air from the slipstream enters thru funnel 39 to cool the exhaust valve and the valve seat insert. This lowers the temperature of the exhaust valve which increases the efficiency and allows the power to be increased.

In Figure 5 is shown a modified design in which the exhaust is dicharged thru pipes 72 to an exhaust collector ring 73 which discharges to atmosphere at a single point, usualy at the bottom. The cowling is 74, the firewall is 75 so in this figure the exhaust valves are cooled by air from the slipstream entering thru a modified form of funnel 39 as in the other figures. This particular funnel is numbered 39a and extends thru the cowling 74 out into the slipstream to collect cooling air for the exhaust valves at a point in the slipstream.

What I claim is:

1. An engine having a cylinder, an exhaust valve for the cylinder, an extension open at both ends and centrally surrounding the exhaust port and the head of the exhaust valve for conveying away the exhaust gases, a turbine, a casing surrounding the cylinder and the extension and leading to the turbine, whereby cooling air first engages the cylinder and then extension, means for discharging cooling air thru the casing and thru the extension, and means for injecting fuel into the casing between the extension discharge and the turbine.

2. The device of claim 1 in which the casing has a venturi constriction and the extension discharges into the Venturi constriction.

3. The device of claim 1 in which a plurality of additional fuel injectors discharge into the casing beyond the turbine.

4. In combination, a gas turbine, an air compressor and a supercharger coaxial with and directly driven by the turbine, an internal combustion engine receiving combustion air from the supercharger and cooling air from the compressor, an extension open at both ends and surrounding the engine exhaust port for mixing the cooling air and exhaust gases and passing the mixture to the turbine to drive the same, and fuel injecting and igniting means between the extension and the gas turbine and proximate the former for use at light loads.

5. In an airplane power plant, a gas turbine, an air compressor, and a supercharger, all mounted on a common shaft, an airplane engine piping receiving combustion air from the supercharger and delivering exhaust products to the turbine, a casing surrounding the engine to receive cooling air from the compressor and discharging such air to mix with the exhaust products for delivery to the turbine, means for deflecting a portion of the cooling air in the casing against the exhaust valve heads of the engine and means for igniting the unburned portions of the exhaust products after mixture with the cooling air, an extension of the casing beyond the turbine to form a combustion chamber, and a plurality of radially disposed fuel injectors and igniters in said combustion chamber.

6. In an airplane power plant a gas turbine, an air compressor, and a supercharger all mounted on a common shaft, an airplane engine, piping receiving combustion air from the supercharger and delivering exhaust products to the turbine, a casing surrounding the engine to receive cooling air from the compressor and discharging such air to mix with the exhaust products for delivery to the turbine, means for delivering combustion air for the engine to the supercharger from the compressor, means for deflecting a portion of the cooling air against the exhaust valve heads of the engine, an oil cooler in the air delivery conduit between the compressor and the engine, and means for igniting the unburned portions of the exhaust products after mixture with the cooling air.

7. In a power plant, a two-cycle diesel engine, a gas turbine, an air compressor and a supercharger directly driven by the turbine, means for delivering scavenging air from the supercharger to the engine, means for delivering cooling air from the compressor to the lower portion of the engine cylinder, then over the cylinder to the turbine, a funnel discharging into a venturi to direct exhaust gases centrally of the cooling air stream on its way to the turbine, a casing forming an extension of means for delivering cooling air, said casing surrounding the turbine and being coaxial therewith, fuel injectors discharging into the combined air and exhaust streams between the venturi and the turbine so that additional fuel may be supplied at light loads and a plurality of fuel injectors and igniters radially disposed in the casing for use in delivering additional fuel in take-off or where maximum power is required.

8. In a power plant, an internal combustion engine, a cooling air casing surrounding the engine, a nozzle within the casing and surrounding the exhaust valve, a funnel leading cooling air from the casing to the nozzle with its intake axis about 135° from the axis of the nozzle discharge and about 90° from the axis of the exhaust valve stem, and means for delivering air under pressure to the funnel.

ARTHUR FREDRICK HORNING, JR.

REFERENCES CITED

The following references are of record in the file of this patent:

UNITED STATES PATENTS

| Number | Name | Date |
| --- | --- | --- |
| 1,410,726 | Schoonmaker | Mar. 28, 1922 |
| 1,635,938 | Hudson | July 12, 1927 |
| 1,961,905 | Michell | June 5, 1934 |
| 2,065,106 | Symons | Dec. 22, 1936 |
| 2,188,444 | Sauer | Jan. 30, 1940 |
| 2,384,381 | Jocelyn | Sept. 4, 1945 |
| 2,409,176 | Allen | Oct. 15, 1946 |
| 2,443,717 | Birmann | June 22, 1948 |

FOREIGN PATENTS

| Number | Country | Date |
| --- | --- | --- |
| 15,348 | Great Britain | June 26, 1897 |
| 118 | Great Britain | Jan. 12, 1912 |
| 14,483 | Great Britain | June 23, 1913 |
| 321,933 | Great Britain | Nov. 19, 1929 |
| 360,382 | Great Britain | Apr. 28, 1930 |
| 507,974 | Great Britain | June 23, 1939 |
| 848,225 | France | July 17, 1939 |

OTHER REFERENCES

Serial No. 287,284, Schmidt (A. P. C.), Published April 27, 1943.